(12) United States Patent
Foesel

(10) Patent No.: US 7,401,558 B2
(45) Date of Patent: Jul. 22, 2008

(54) DIESEL-ELECTRIC LOCOMOTIVE

(75) Inventor: Ulrich Foesel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 594 days.

(21) Appl. No.: 10/937,261

(22) Filed: Sep. 10, 2004

(65) Prior Publication Data
US 2005/0081739 A1    Apr. 21, 2005

(30) Foreign Application Priority Data
Sep. 10, 2003    (DE)    ................ 103 41 774

(51) Int. Cl.
*B61C 1/00*    (2006.01)
(52) U.S. Cl. .................................... 105/26.05
(58) Field of Classification Search ............. 105/26.05, 105/34.1, 35, 49, 62.1
See application file for complete search history.

(56) References Cited

U.S. PATENT DOCUMENTS

| | | | |
|---|---|---|---|
| 5,735,215 A * | 4/1998 | Tegeler ..................... 105/34.1 |
| 6,267,062 B1 * | 7/2001 | Hamilton, Jr. ............ 105/26.05 |
| 6,308,639 B1 * | 10/2001 | Donnelly et al. .............. 105/50 |
| 6,418,858 B1 * | 7/2002 | Hentschel et al. ............. 105/61 |
| 6,523,654 B2 * | 2/2003 | Brooks ....................... 191/1 R |
| 6,591,758 B2 * | 7/2003 | Kumar ........................ 105/35 |

FOREIGN PATENT DOCUMENTS

DE    43 02 704 A1    8/1994

\* cited by examiner

*Primary Examiner*—S. Joseph Morano
*Assistant Examiner*—Robert J McCarry, Jr.
(74) *Attorney, Agent, or Firm*—Harness, Dickey & Pierce, P.L.C.

(57) ABSTRACT

A diesel-electric locomotive includes a diesel engine which is connected to a generator. A cable originates from the generator to supply electrical power to a drive unit. An additional cable originates from the generator to supply electrical power to secondary appliances. The additional cable further includes a transformer therein.

18 Claims, 1 Drawing Sheet

DIESEL-ELECTRIC LOCOMOTIVE

The present application hereby claims priority under 35 U.S.C. §119 on German patent application number DE 103 41 774.5 filed Sep. 10, 2003, the entire contents of which are hereby incorporated herein by reference.

FIELD OF THE INVENTION

The invention generally relates to a diesel-electric locomotive. Preferably, it relates to one having a diesel engine which is connected to a generator, with a cable originating from the generator in order to supply electrical power to a drive unit.

This is generally a three-phase cable.

BACKGROUND OF THE INVENTION

In addition to the drive unit, secondary appliances, which likewise have to be supplied with electrical power, may be arranged in a locomotive or else in the cars connected to the locomotive. One such secondary appliance, by way of example, may be a fan. Since these secondary appliances require a lower electrical voltage than the drive unit, it has until now been normal to use an auxiliary generator which is designed for the voltage required by the secondary appliances, and is connected to the diesel engine in precisely the same way as the generator which is intended for the drive unit.

The use of two generators in a diesel-electric locomotive is complex. This is due to the fact that a generator contains rotating parts, as a result of which it not only has a high procurement price, but must also be maintained and repaired, which is costly.

Despite these disadvantages, two generators have always been installed in a diesel-electric locomotive, for a very long time period.

SUMMARY OF THE INVENTION

An embodiment of the invention may include an object of specifying a diesel-electric locomotive whose cost is lower than a previously normal diesel-electric locomotive, and which, furthermore, requires less maintenance effort.

According to an embodiment of the invention, an object may be achieved in that an additional cable originates from the generator in order to supply electrical power to secondary appliances, and has a transformer included in it.

The additional cable generally may be a three-phase cable, and the transformer may be a three-phase transformer.

The original cable originates from the same generator as the cable which leads to the drive unit. The additional cable may, however, also branch off in an equivalent manner at a branching point from the cable which leads to the drive unit.

The diesel-electric locomotive according to an embodiment of the invention results in the advantage that it avoids the costs for a second generator, specifically for the auxiliary generator, while only the considerably lower costs for a transformer need to be invested. This is because, for example, the costs for a suitable auxiliary generator for supplying the secondary appliances are five times the costs of a suitable transformer. Furthermore, complex maintenance work is avoided since, in contrast to a generator, a transformer has no rotating parts.

One particular advantage is that only one generator need to be mechanically connected to the diesel engine, thus in this way saving space. This is because the transformer is only electrically connected to the single generator, so that it can be arranged at any desired point. There is no need to provide space behind the diesel engine for an auxiliary generator that is rigidly connected to it. In particular, the diesel-electric locomotive according to the invention can thus be shorter than a conventional locomotive, in which at least two generators are mechanically connected to the diesel-engine.

Finally, the use of a transformer instead of an additional auxiliary generator frequently also results in a weight advantage. A suitable externally ventilated transformer may have a mass which is, for example, 90 kg less than that a suitable auxiliary generator.

However, in particular, this results in the advantage of providing a low-cost locomotive, of simple design and which is easy to maintain.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention.

A diesel-electric locomotive of the previously normal type and a diesel-electric locomotive according to an embodiment of the invention will be explained in more detail with reference to the drawings, wherein.

DETAILED DESCRIPTION OF THE PREFERRED EMBODIMENTS OF THE INVENTION

Figure 1:
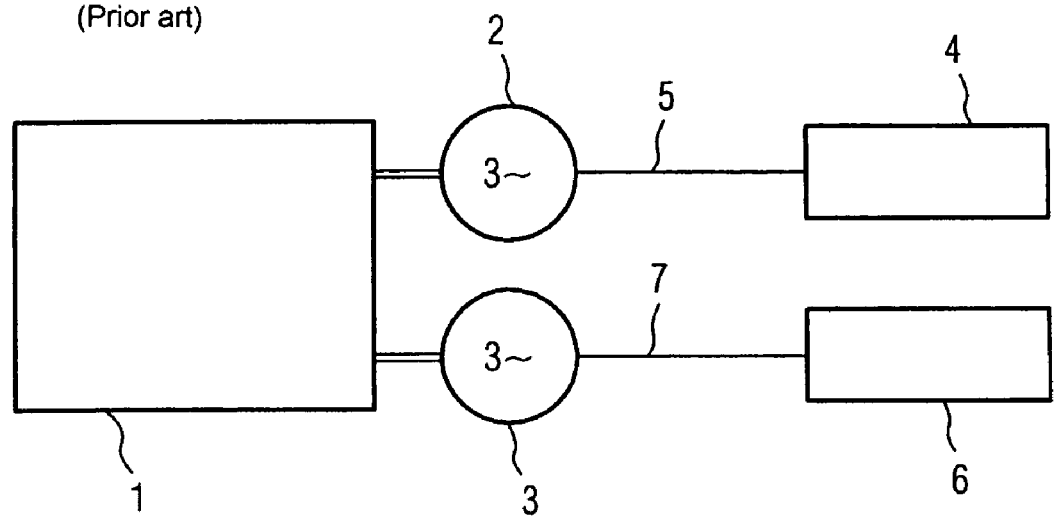
FIG. 1 shows, schematically, a conventional diesel-electric locomotive according to the prior art, with two generators.

The diesel-electric locomotive according to the prior art, and as shown in FIG. 1, has a diesel engine 1 which drives a generator 2 and an auxiliary generator 3. The generator 2 is used for supplying electrical power to a drive unit 4 for the locomotive. For this purpose, the output side of the generator 2 is connected via a cable 5 to the drive unit 4.

Secondary appliances 6 in the locomotive, or else in cars in a train, for example a fan, require electrical power which is at a different voltage to the electrical power for the drive unit 4. Thus, in the prior art, the auxiliary generator 3, which is designed for this voltage, is connected to the diesel engine 1 in precisely the same way as the generator 2. On the output side, the auxiliary generator 3 is connected to secondary appliances 6 via an auxiliary circuit cable 7.

Thus, until now, there have always been two generators in a diesel-electric locomotive.

Figure 2:
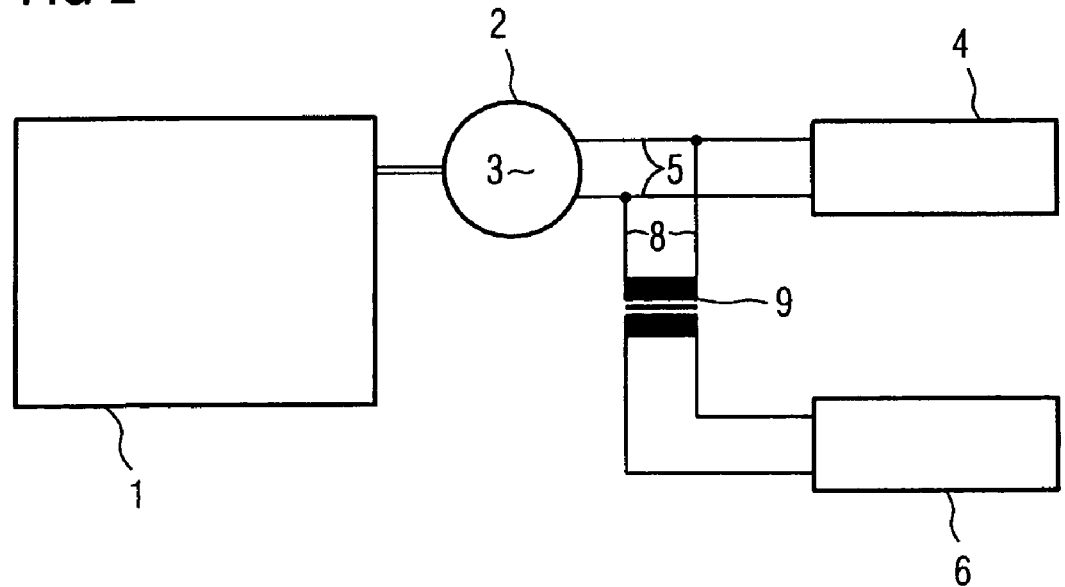
FIG. 2 shows, schematically, a diesel-electric locomotive according to an embodiment of the invention, which has only one generator and a transformer in the circuit for the secondary appliances. In this case, for simplicity, two-phase cables are shown rather than three-phase cables.

FIG. 2 shows a diesel engine 1 in a diesel-electric locomotive according to an embodiment of the invention, which is connected to a generator 2, with a cable 5 which leads to the drive unit 4 originating from the output side of this generator 2. In the embodiment of the diesel-electric locomotive according to an embodiment of the invention, an additional cable 8 originates from the generator 2 in order to supply electrical power to an auxiliary circuit for secondary appliances 6. This additional cable 8 may also branch off from the cable 5. A transformer 9 is included in the additional cable 8, by means of which the voltage that is generated by the generator 2 is converted to the voltage that is required for the secondary appliances 6. Although a two-phase transformer is shown, the transformer 9 may be a three-phase transformer if the electrical system in the locomotive is a three-phase system with a three-phase cable.

Advantageously, only one generator 2 is required. Although the transformer 9 is required instead of the previously normal auxiliary generator 3, the apparatus according to an embodiment of the invention costs less than the previously normal apparatus. In particular, this is because every generator has rotating parts, which not only make it expensive but also require extensive maintenance. If the costs for a previously normal externally ventilated auxiliary generator 3 are compared with the costs of an externally ventilated transformer 9, then this is a considerable cost advantage for the transformer 9. Specifically, the cost of a suitable generator is three to five times that of a transformer. This represents a large saving owing to the large number of diesel-electric locomotives which are newly constructed every year.

A further advantage is that the transformer 9 can be accommodated in a space-saving manner, since it is connected only electrically. With only a slightly longer cable run, it can be accommodated at any desired point in the locomotive, while the auxiliary generator 3 must always be mounted at a fixed point owing to the mechanical connection to the diesel engine 1. Since less space is required in the locomotive, this results in the locomotive being shorter, and this advantageously leads to reduced locomotive weight.

Furthermore, even the weight of an externally ventilated transformer 9 that is suitable for the required purpose is less than the weight of the auxiliary generator 3 that is saved.

If the weight of a locomotive is less, then less drive power is required.

The device according to an embodiment of the invention makes it possible to achieve a considerable cost advantage over previously normal devices.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A diesel-electric locomotive comprising:
    a diesel engine connected to a generator;
    a cable originating from the generator to supply electrical power to a drive unit; and
    an additional cable originating from the generator to supply electrical power to secondary appliances, the additional cable including a transformer.

2. The diesel-electric locomotive of claim 1, wherein the transformer is located in the additional cable.

3. The diesel-electric locomotive of claim 1, wherein the additional cable branches off from the cable.

4. The diesel-electric locomotive of claim 2, wherein the additional cable branches off from the cable.

5. The diesel-electric locomotive of claim 1, wherein the transformer is adapted to convert a voltage generated by the generator to a voltage for the secondary appliances.

6. The diesel-electric locomotive of claim 1, wherein the transformer is a two-phase transformer.

7. The diesel-electric locomotive of claim 1, wherein the transformer is a three-phase transformer.

8. A locomotive including a generator, comprising:
    a first cable connected to the generator to supply electrical power to a drive unit; and
    a second cable connected to the generator to supply electrical power to secondary appliances, the second cable including a transformer;
    wherein the locomotive is a diesel-electric locomotive.

9. The of locomotive claim 8, wherein the transformer is located in the second cable.

10. The locomotive of claim 8, wherein the second cable branches off from the first cable.

11. The locomotive of claim 9, wherein the second cable branches off from the first cable.

12. The locomotive of claim 8, wherein the transformer is adapted to convert a voltage generated by the generator to a voltage for the secondary appliances.

13. The locomotive of claim 8, wherein the transformer is a two-phase transformer.

14. The locomotive of claim 8, wherein the transformer is a three-phase transformer.

15. The locomotive of claim 8, further comprising a diesel engine connected to the generator.

16. A locomotive including a generator, comprising:
    a first cable connected to the generator to supply electrical power to a drive unit; and
    a second cable connected to the generator to supply electrical power to secondary appliances, the second cable including means for converting a voltage generated by the generator to a voltage for the secondary appliances;
    wherein the locomotive is a diesel-electric locomotive.

17. The locomotive of claim 16, further comprising a diesel engine connected to the generator.

18. The locomotive of claim 16, wherein the second cable branches off from the first cable.

* * * * *